US006224380B1

(12) United States Patent
Lo et al.

(10) Patent No.: US 6,224,380 B1
(45) Date of Patent: May 1, 2001

(54) PORTABLE AND COMPACT MOTION SIMULATOR WITH A SINGLE DEGREE-OF-FREEDOM

(75) Inventors: Patrick K. Lo, Monterey Park; Robert A. Dietrich, Montebello, both of CA (US)

(73) Assignee: Interactive Motion Systems, Monterey Park, CA (US)

( * ) Notice: Subject to any disclaimer, the term of this patent is extended or adjusted under 35 U.S.C. 154(b) by 0 days.

(21) Appl. No.: 09/346,083

(22) Filed: Jul. 1, 1999

Related U.S. Application Data

(63) Continuation-in-part of application No. 08/915,259, filed on Aug. 20, 1997, now Pat. No. 5,954,508.

(51) Int. Cl.[7] ........................................ G09B 9/00
(52) U.S. Cl. .................. 434/55; 434/44; 434/58; 434/69; 434/307 R; 297/257; 463/46
(58) Field of Search .................. 434/29–35, 37, 434/40, 43, 45, 51, 55–62, 69, 307 R, 308, 365, 372; 472/7, 8, 29, 32, 33, 59–61, 128, 130; 463/2, 34, 46; 297/240, 257, 344.2, 344.16, 344.17; 703/7, 8; 345/121, 145, 156

(56) References Cited

U.S. PATENT DOCUMENTS

| | | | | |
|---|---|---|---|---|
| 2,063,231 | * | 12/1936 | Custer | 434/55 |
| 3,494,052 | * | 2/1970 | Corlyon | 434/55 |
| 3,618,256 | * | 11/1971 | Monks | 446/7 |
| 3,890,722 | * | 6/1975 | Nunez | 434/55 |
| 3,984,924 | * | 10/1976 | Myles et al. | 434/29 |
| 4,343,610 | | 8/1982 | Chou . | |
| 4,464,117 | * | 8/1984 | Foerst | 434/67 |
| 4,478,407 | | 10/1984 | Manabe . | |
| 4,711,447 | | 12/1987 | Mansfield . | |
| 4,887,967 | * | 12/1989 | Letovsky et al. | 434/61 |
| 4,976,438 | | 12/1990 | Tashiro et al. . | |
| 5,022,708 | | 6/1991 | Nordella et al. . | |
| 5,199,875 | | 4/1993 | Trumbull . | |
| 5,316,480 | | 5/1994 | Ellensworth . | |
| 5,415,550 | * | 5/1995 | Aoki et al. | 434/61 |
| 5,490,784 | | 2/1996 | Carmein . | |
| 5,507,647 | * | 4/1996 | Morris | 434/55 |
| 5,509,806 | | 4/1996 | Ellensworth . | |
| 5,533,935 | | 7/1996 | Kast . | |
| 5,547,382 | * | 8/1996 | Yamasaki et al. | 434/61 |
| 5,605,462 | | 2/1997 | Denna . | |
| 5,678,889 | | 10/1997 | Purcell, Jr. . | |
| 5,782,639 | * | 7/1998 | Beal | 434/29 |
| 5,951,404 | * | 9/1999 | Oishi et al. | 472/60 |
| 6,038,940 | * | 3/2000 | Rosheim | 74/490.11 |
| 6,039,653 | * | 3/2000 | Engstrand | 472/59 |

FOREIGN PATENT DOCUMENTS 5-323860   12/1993   (JP) .

* cited by examiner

*Primary Examiner*—Joe H. Cheng

(57) ABSTRACT

The portable and compact motion simulator (10) comprises of a platform (22), a support base (20), one powered and controlled extensible member (24), and a motion base controller (26). The simulator can be used like a seat cushion that can be placed on a chair or can be part of a chair. The platform (22) is driven by the said extensible member (24) via a motion base controller (26) to effect motion along the single degree-of-freedom in synchronization with audio and visual images. The said motion base controller (26) provides computing resources to operate and control the motion simulator (10), thereby eliminating the need for computing resources external to the motion simulator (10). A dynamics control means (40) optimizes the dynamic performance of the motion base in accordance with the weight of the patron (02). The portable and compact motion simulator (10) is designed to simulate motion for a patron playing an interactive computer game or participating in a virtual reality experience.

20 Claims, 8 Drawing Sheets

Prior Art

Prior Art

180
PORTABLE AND COMPACT MOTION SIMULATOR WITH A SINGLE DEGREE-OF-FREEDOM

This application is a continuation-in-part of U.S. patent application Ser. No. 08/915,259, filed Aug. 20, 1997, entitled "Portable and Compact Motion Simulation", now U.S. Pat. No. 5,954,508.

BACKGROUND

1. Field of the Invention

This invention relates to a portable and compact motion simulator apparatus, and more particularly, to a motion simulator system designed to simulate motion for a person playing an interactive computer game or participating in a virtual reality experience.

2. Description of Prior Art

Motion simulators for training and amusement are well known in the art. Aircraft simulators for use by the military and commercial airlines incorporate highly sophisticated hydraulic drive systems often offering up to six degrees-of-freedom. Amusement rides offering motion simulation have typically employed technology very similar to the high fidelity aircraft training simulators while somewhat reducing complexity and cost. A typical system employs a platform having an occupant station which incorporates a means for visual simulation through motion picture or computer-generated scenery imaging. The occupant platform is mounted on or suspended from multiple actuators which impart motion to the platform. Alternatively, the occupant platform is mounted on a multiple-gimbal system with multiple actuators to generate motion. The number and mounting locations of the actuators are determined in engineering tradeoffs for size of the actuators and the equations of motion to be used for the simulation.

For amusement rides and motion theater applications, aircraft training simulators are often too large in size, too complex in installation, and too costly to maintain and operate. The solution lies in miniaturization which can reduce the cost of motion simulators in two major ways. Firstly, motion simulators are re-packaged to decrease the overall system size without reducing any range of motion. Decreasing the system size tends to have a cascading effect on the motion simulator size and component size. Ultimately, the miniaturized motion simulators can be housed in standard commercial building structures. Numerous patent designs have been found to follow this path. Secondly, motion simulators are simplified by reducing the range of motion. Since the required performance for amusement rides or motion theater applications are not as vigorous and stringent as the aircraft training simulators, the exact equations of motion can be modified to maintain the level of excitement with simpler installation. Such simplification reduces hardware complexity as well as demand on computing power to run the simulation. Numerous existing patented designs have been the results of trading off the complexity of the motion system against the range of motion.

All but few of the miniaturization efforts have been directed to optimize commercially or institutionally owned motion simulators. Personal ownership has not been practical because 1) the large size of the system that cannot be practically adopted for home use, 2) a complex system that cannot be reasonably installed and maintained by most people, and 3) the high costs of the motion system and dedicated computer required to run the simulation.

Innovations in the area of home computing have vastly improved the fidelity of computer games at home. With multi-media presentation, the computer game experience often encompasses visual effects through the graphics display on the video monitor and audio effects through the monitor speakers. But game related hardware are often limited to input control devices such as joystick, control pedals, yoke, etc. Motion simulators, which have been proven commercially, are capable of enhancing the home computer game experience to a new level. With the computing power required for complex motion simulation becoming available in most home computers and microprocessors, the prerequisite for home use motion simulation is met. But such adoption is not trivial, the motion simulators have to be miniaturized to an extent that has not been achieved in all known designs. And, they have to be constructed with simplicity and ingenuity to get the cost down to an economically viable level.

From the design standpoint, such motion simulators have to be low-cost and they have to be able to create a sense of motion that can add to the sensation of computer game play. At the same time, the motion simulators have to be small and portable to be accepted by the users. They also have to be simple to install and maintain.

There have been several noted efforts in miniaturization of motion simulators. The "portable simulator apparatus", patented in U.S. Pat. No. 5,316,480 and U.S. Pat. No. 5,509,806 (continuation in part of U.S. Pat. No. 5,316,480) to T. Ellsworth dated May 31, 1994 and Apr. 23, 1996 respectively, affords a mobile and transportable motion simulator. Yet the miniaturized system consists of several roadable trailers.

In two other known prior-art systems, U.S. Pat. No. 5,022,708 to Nordella dated Jun. 11, 1991 and U.S. Pat. No. 5,605,462 to Denne in Feb. 25, 1997, the motion simulators have been brought down to the size of a chair. Even with the amiable efforts, both designs have come short of being suitable for home use or personal ownership.

The last prior-art system worth mentioning in the current context is the design patented in U.S. Pat. No. 4,343,610 by Chou dated Aug. 10, 1982. This motion simulator in this patent is a large system for commercial application.

None of the above patents suggest a truly portable motion simulator or system that can simulate motion for a person playing an interactive computer game or participating in a virtual reality experience.

OBJECTS AND ADVANTAGES

It is an object of the present invention to provide a portable and compact motion simulator with a single degree-of-freedom.

It is an additional object of the present invention to introduce several design applications of the portable and compact motion simulator with a single degree-of-freedom.

It is another object of the present invention to provide a portable and compact simulator system for interactive computer game and virtual reality experience application.

It is yet another object of the present invention to introduce a motion base controller with computing resources to operate and control a portable and compact motion simulator and the method therefor.

It is a further object of the present invention to introduce a dynamics control means to optimize the dynamic performance of the motion simulator in accordance with the weight of the patron and the method therefor.

Accordingly, several advantages of our invention are (a) The portable and compact motion simulator is small in size and light-weight. In the smallest form, it is approximately the size of a seat cushion. It can be placed on a regular chair or armchair when it is in use. It can be stored in a closet or garage when not in use. A young adult can carry the portable and compact motion simulator with ease thus allowing versatility for home use and portability at the personal level.

The Nordella motion simulator is approximately the size of a chair and it allows all six degrees of freedom. In practice, this motion simulator is quite a bit larger after taking into account the hydraulic pump and the fluid reservoir. It also requires a substantial portion of the mechanical system to be installed in a trench below the floor level. While this invention qualifies as a small motion simulator, it fails to meet the home use and portability criteria. Likewise, the Denne motion simulator takes up all the space underneath the seat, requires extra room for hydraulic pumps and fluid reservoir, and needs to be installed onto a floor like structure. Thus it fails to meet the home use and portability criteria as well. The Ellsworth motion simulator is portable but it is not light-weight or small. It is definitely not suitable for home use or portable at the personal level.

(b) Installation of the portable and compact motion simulator is simple. It can be used like a seat cushion. Installation or set-up includes the following steps:

1) placing the motion simulator on a sturdy chair;
2) connecting the motion simulator to the home computer or a control device; and
3) plugging the motion simulator to a standard 110V electrical wall outlet.

In comparison, the Ellsworth portable motion simulator require each of the six roadable trailers to be individually lifted into place by portable cranes or jacks.

(c) The movable platform includes an accommodation for a patron. In the simplest form, the platform provides a sitting surface. By making the accommodation an integral part of the platform, it eliminates the need for intermediate structural elements. Thus, the present invention constitutes the smallest possible number of structural elements for a motion simulator. Both the part count and overall cost are reduced; more importantly, the overall vertical height is minimized.

The Denne motion simulator is consisted of a base support, a platform, actuating elements, and a seating structure. The present invention combines the equivalent platform and the seating structure into a single part.

(d) The portable and compact motion simulator is capable of creating a sense of motion for a patron the size of a fully-grown adult. The motion simulator is engineered to provide dynamic performance for an adult of 250 pounds in weight.

(e) This invention employs a direct drive system architecture which is superior to the multiple-gimbal systems in terms of dynamic response performance and efficiency. The multiple-gimbal system such as commonly used to stabilize gyros and the like, effectively provides different component rotational motion between successive platforms. Because of the need to support one platform on another, the multiple-gimbal system is inherently subject to excessive "dead" mass which can dynamically compromise its performance, particularly for high speed response applications. The direct drive system also demands less power, thus smaller actuators, than the comparable multiple-gimbal system.

(f) A motion base controller provides computing resources to operate and control a portable and compact motion simulator, thereby eliminating the need for computing resources external to the motion simulator. The motion base controller has a communication means to receive control signals from the joystick or the computer game via the home computer, a processing means to generate the appropriate command signals, and another communication means to send the command signals to the actuation element or powered and controlled extensible member. The home computer can therefore be reserved for running the computer game, and none of its resources will be diverted to run the motion base controller or the motion simulator.

In practice, having the built-in computing resources makes the portable and compact motion simulator a truly standalone design. It enhances the portability and adaptability of the motion simulator to any home computer by simplifying the installation procedure. This motion base controller can be applied to portable and compact motion simulators with various different range of motions. The command signals can be sent to multiple actuation elements to impart motion in different degrees-of-freedom.

In many of the known motion simulator designs, a controller is provided to receive and process signals. But it relies on a dedicated computer external to the motion simulator to provide the necessary computing resources for operation and control. A two degrees-of-freedom motion simulator by Rock'n'Ride, commercially launched in 1997, uses an internal motion base controller to provide the necessary computing resources for simulation. That motion base consists of a full-sized chair, an external frame, a pedestal structure, and a pneumatic compressor unit to provide actuation power. Thus, the Rock'n'Ride motion simulator precludes the present invention which applies to portable and compact motion simulators.

(g) A dynamics control means is provided to optimize the dynamic performance of the motion simulator in accordance with the weight of the patron. In the traditional motion simulators, the dynamic characteristics and performance of the simulation system are often engineered to account for the tare weight of the system. The patron weight, being small compared to that of the system, has no significant impact on the dynamic performance of the motion simulator. This paradigm does not hold for compact motion simulator for two reasons. Firstly, the tare weight of the compact motion simulator is small compared to the patron's weight. Secondly, there are no simple ways to design a compact motion simulator that works equally well for a 120 pound patron and a 250 pound patron. For example, a compact motion simulator built for a single 250 pound patron may impose excessive dynamic input to a 120 pound patron. The said dynamics control means provides an adjustment to directly affect the velocity and acceleration profiles of the motion simulator in accordance with the weight of the patron. In practice, it is installed both as a means to optimize the dynamic performance as well as a safety device.

The design described in Kodama's Japanese patent, JP 405323860 dated Dec. 7, 1993, depicts a mechanical adjustment on an individual motion theater seat that controls the total amount of travel on that seat. The described control does not allow adjustment on the dynamic performance of the motion simulation such as acceleration rate or speed of motion.

Further objects and advantages of our invention will become apparent from a consideration of the drawings and ensuing description.

DRAWING FIGURES

For a better understanding of the present invention, reference is made to the accompanying drawings in which FIGS. 1A and 1B show two prior-art motion simulator designs that incorporated some degree of miniaturization.

FIG. 2 pertains to our invention. The portable and compact motion simulator being used in a computer game application.

Figure 1A:
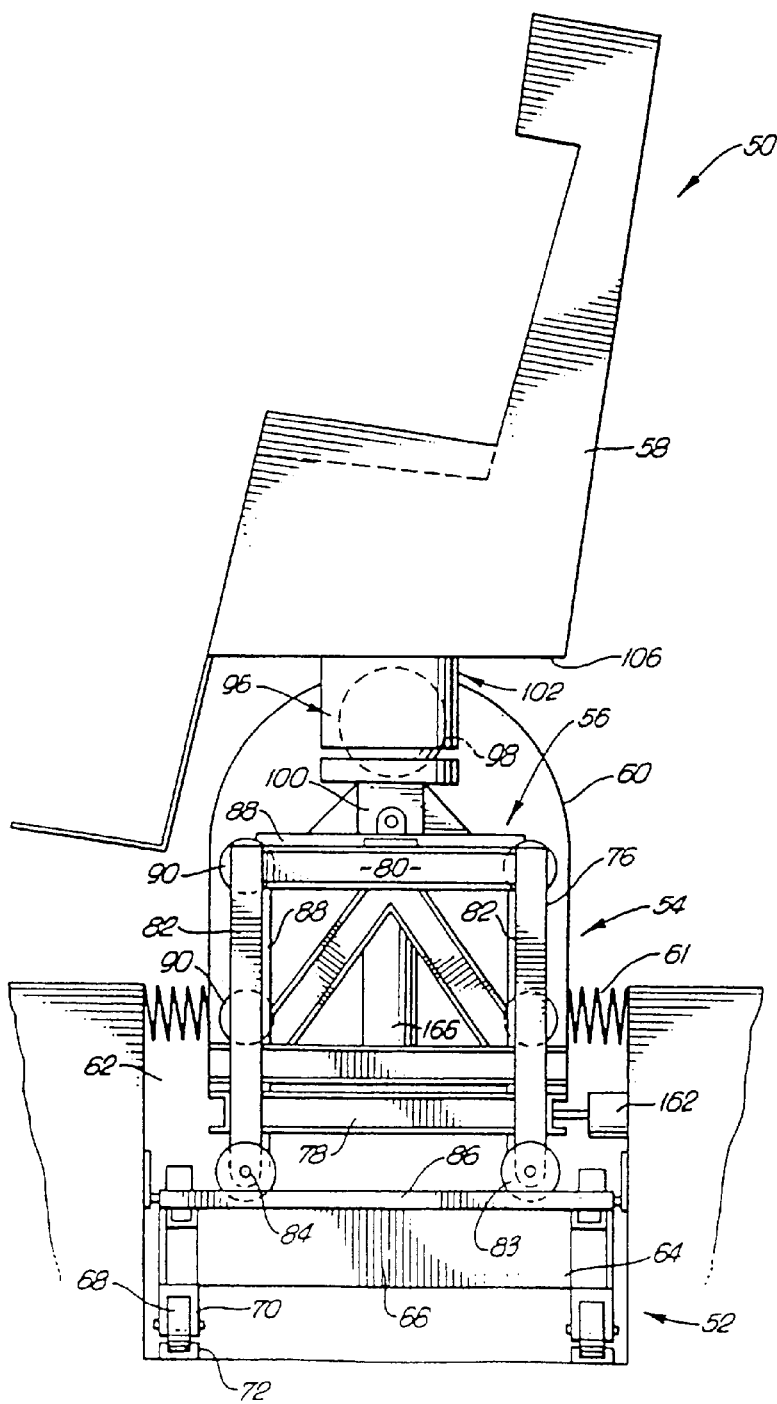
Figure 1B:
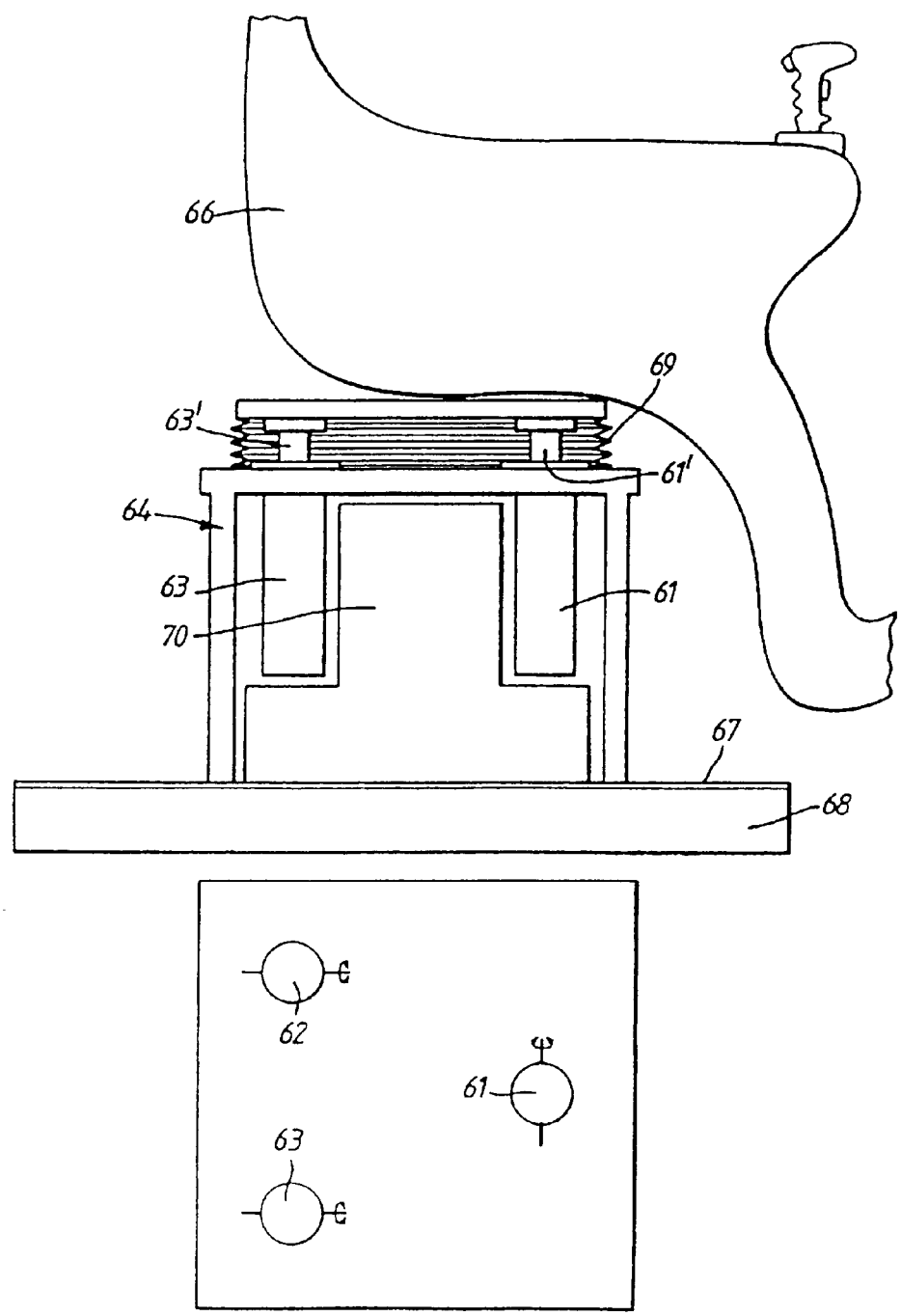

REFERENCE NUMERALS IN DRAWINGS 02 patron
04 joystick
06 chair
08 home computer
10 portable and compact motion simulator
12 pitch
14 roll
16 yaw
20 support base
22 platform
24 powered and controlled extensible member
26 motion base controller
28 support column
30 multi purpose joint atop a powered and controlled extensible member
32 pivot joint atop a support column
40 dynamics control means
41 adjustable means
42 feedback sensor
43 sensing means
44 communication means
46 processing means
50 control signals
52 feedback signals
54 command signals

SUMMARY

This invention relates to a portable and compact motion simulator that is small in size and light-weight. Portability allows it to be used effectively in the home environment and be stored away in a closet or garage when not in use. The portable and compact motion simulator with a single degree-of-freedom is made up of two essentially parallel plates: the platform and the support base. A single powered and controlled extensible member is placed between the two plates connecting them without restricting relative movement of the attachment points. The platform is driven by the extensible member via the motion base controller to effect motion along the single degree-of-freedom in synchronization with audio and visual images. The said motion base controller provides computing resources to operate and control the motion simulator, thereby eliminating the need for computing resources external to the motion base. A dynamics control means optimizes the dynamic performance of the motion simulator in accordance with the weight of the patron. The portable and compact motion simulator is designed to simulate motion for a patron playing an interactive computer game or participating in a virtual reality experience.

DESCRIPTION OF INVENTION

Figure 2:
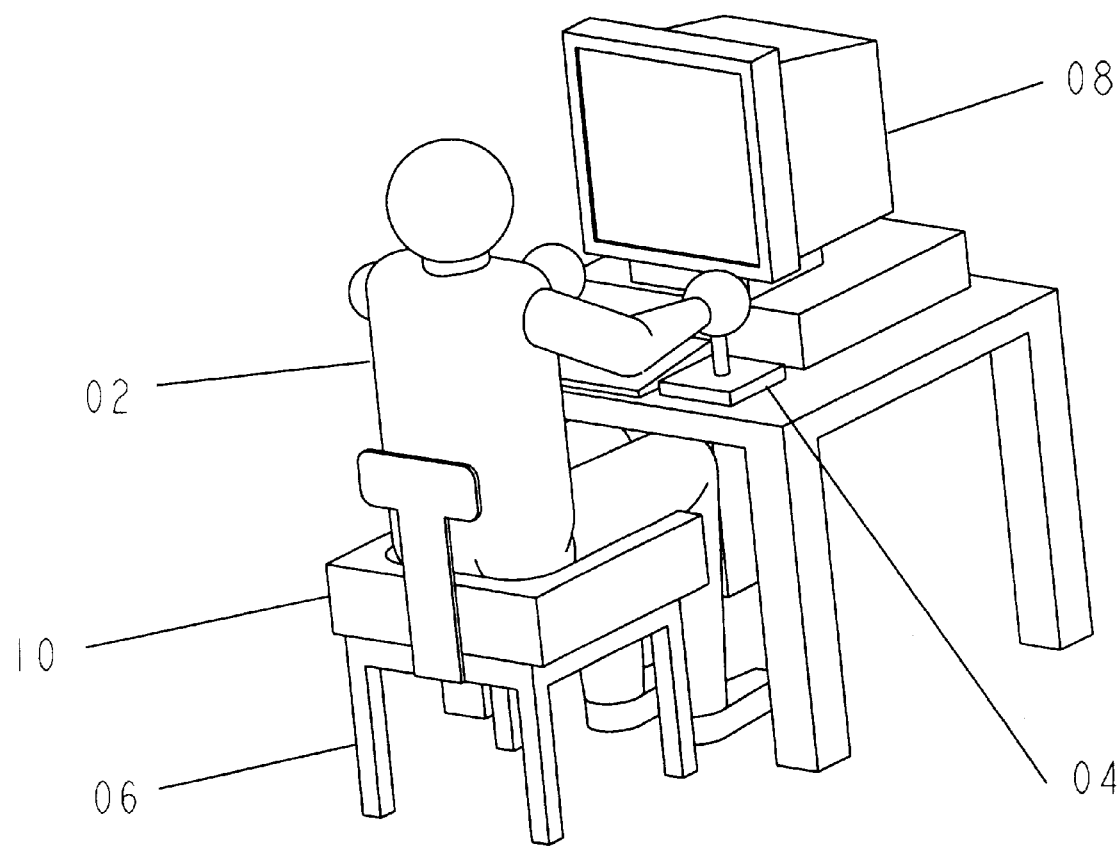

In FIG. 2, the portable and compact motion simulator (10) of this invention is shown to be used in an interactive computer game play. The patron (02) sits on the motion simulator (10) which is placed on a chair (06). The motion simulator (10) is connected to a home computer (08) and a joystick (04).

The patron (02) sends control signals from the joystick (04) to the computer game via the home computer (08). In doing so, the visual images are changed on the display monitor. The same control signals are sent to the motion simulator (10) to create motion. Thus, synchronized motion are imparted to enhance the fidelity of computer game play. The joystick (04), a typical input control device, serves in the capacity of a motion control device.

Figure 3A:
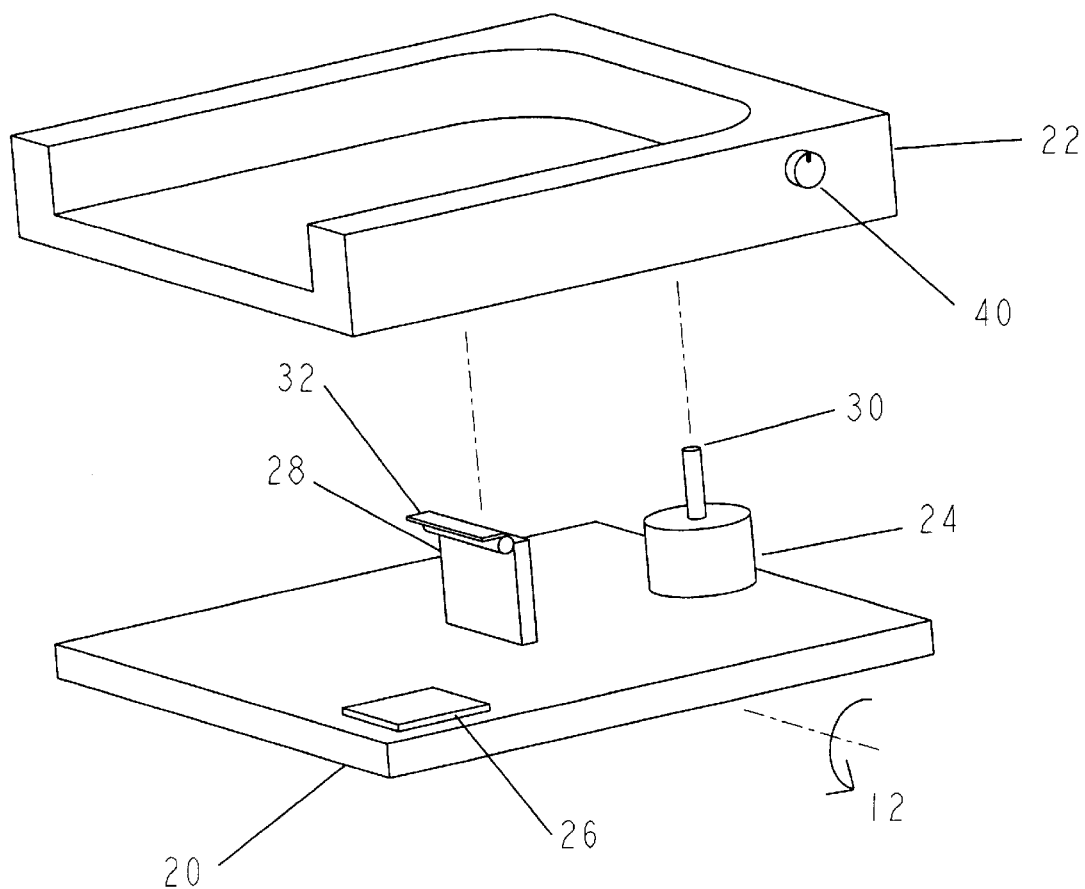
FIG. 3A depicts an exploded view of a portable and compact motion simulator with single degree-of-freedom in pitch.

In FIG. 3A, the portable and compact motion simulator (10) of this invention is shown in a configuration that allows pitch (12) motion. The motion base is comprised of a support base (20), a platform (22), a powered and controlled extensible member (24), a support column (28), a dynamics control means (40), and a motion base controller (26). The support base (20) which supports the rest of the motion base is a flat plate. It also allows mounting provisions for other motion base components. The platform (22) supports and transfers motion to the patron (02). The powered and controlled extensible member (24) connects the underside of the platform (22) and the support base (20). A connection or joint (30) permitting universal relative movement about the point is provided at the top of the extensible member (24). The extensible member (24) is actuated through the motion base controller (26). The support column (28) is located approximately at the center of the support base (20). Atop the support column (28) is a connection or joint (32) permitting only rotational movement about the pitch (12) axis. This pivot joint (32) can be different from the rotation joint (30) atop the extensible member (24). In the simplest form, the pivot joint (32) can be a hinge that allows the movable platform (22) to pitch (12) with respect to the support base (20). The motion base controller (26) is located inside the space between the movable platform (22) and the support base (20). A dynamics control means (40) is installed on the side of the movable platform (22) to allow easy access. The patron (02) uses the dynamics control means (40) to adjust the dynamic performance of the motion base (10). In addition, the sensing means detecting the weight of the patron and sending a signal regarding to the detected weight to an adjustable means (41) which is installed on the movable platform (22), thereby to provide input to the motion base controller (26) for adjusting changes in velocity and acceleration profiles. Therefore the dynamic performance of the motion base (10) is optimized.

In the preferred embodiment, the support column (28) is located approximately at the center of the support base (20). The powered and controlled extensible member (24) is placed directly behind the support column (28). Placements of the support column (28) and the extensible member (24) are not critical to the design of our motion base. In the present state of the art, many means are known for actuating the extensible member and any suitable means may be employed. The actual shape of the top side of the platform (22) allows a shorter overall vertical height but it is not essential to our motion base.

Figure 3B:
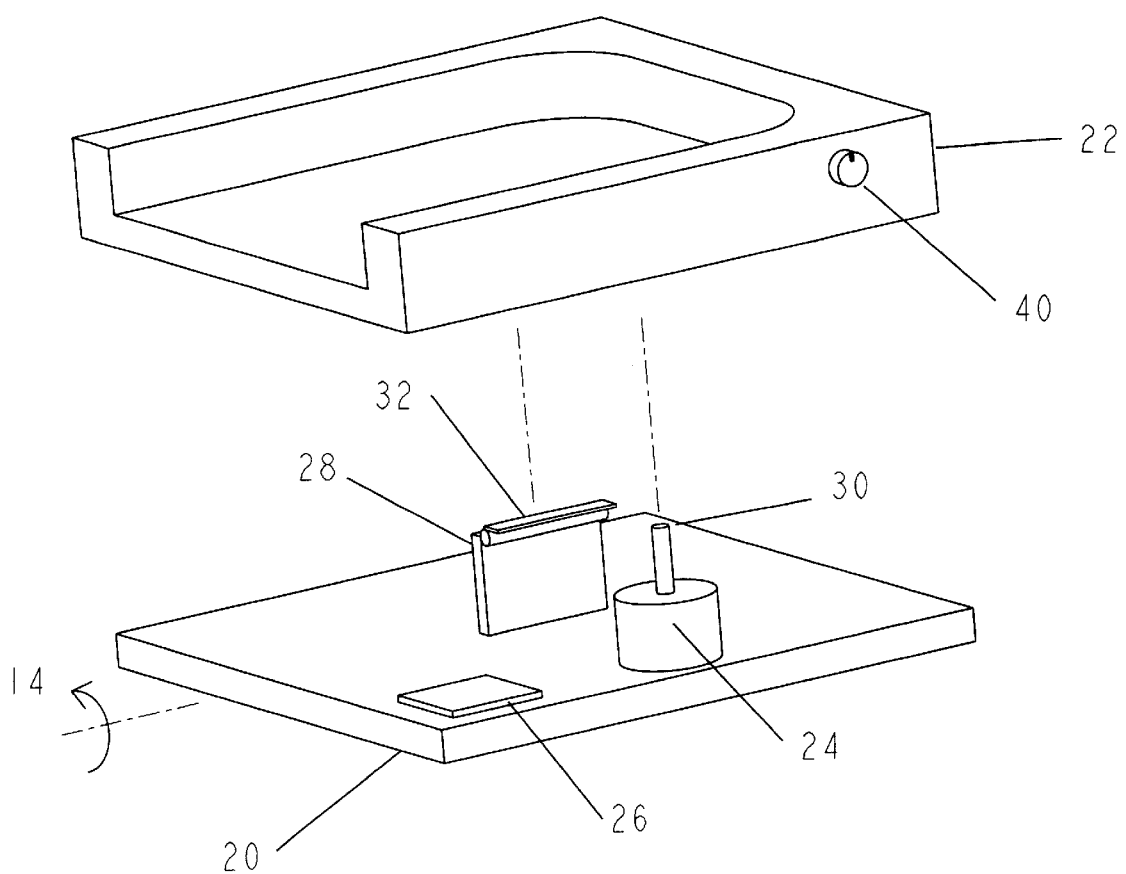
FIG. 3B shows an exploded view of a portable and compact motion simulator with a single degree-of-freedom in roll.

Referring now to FIG. 3B, the portable and compact motion simulator (10) is shown in a configuration that allows roll (14). The construction is very similar to the design shown in FIG. 3A with the exception of the pivot joint (32) atop the support column (28) and the placement of the powered and controlled extensible member (24). The pivot joint (32) in this design allows the movable platform (22) to roll (14) with respect to the support base (20). In the preferred embodiment, the powered and controlled extensible member (24) is placed to the side of the support column (28).

Figure 3C:
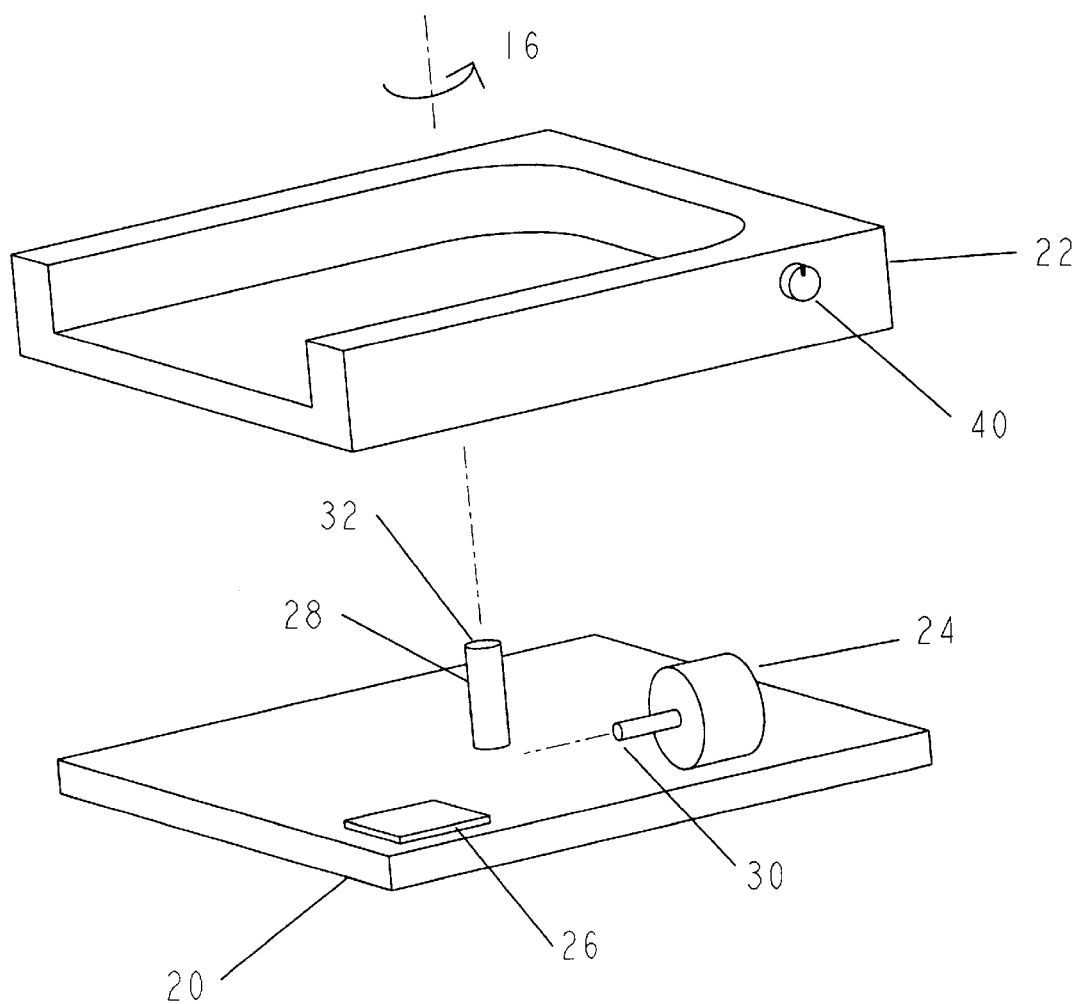
FIG. 3C shows an exploded view of a portable and compact motion simulator with single degree-of-freedom in yaw.

Referring now to FIG. 3C, the portable and compact motion simulator (10) is shown in a configuration that allows yaw (16). The construction is very similar to the design shown in FIG. 3A with the exception of the pivot joint (32) of the support column (28) and the placement of the powered and controlled extensible member (24). The pivot joint (32) in this design allows the movable platform (22) to yaw (16) with respect to the support base (20). In the preferred embodiment, the pivot joint (32) is a hinge or bearing with the axis of rotation lies up vertically. The powered and controlled extensible member (24), lies in a near horizontal plane, when actuated causes the platform (22) to yaw (16) with respect to the support base (20).

Figure 4:
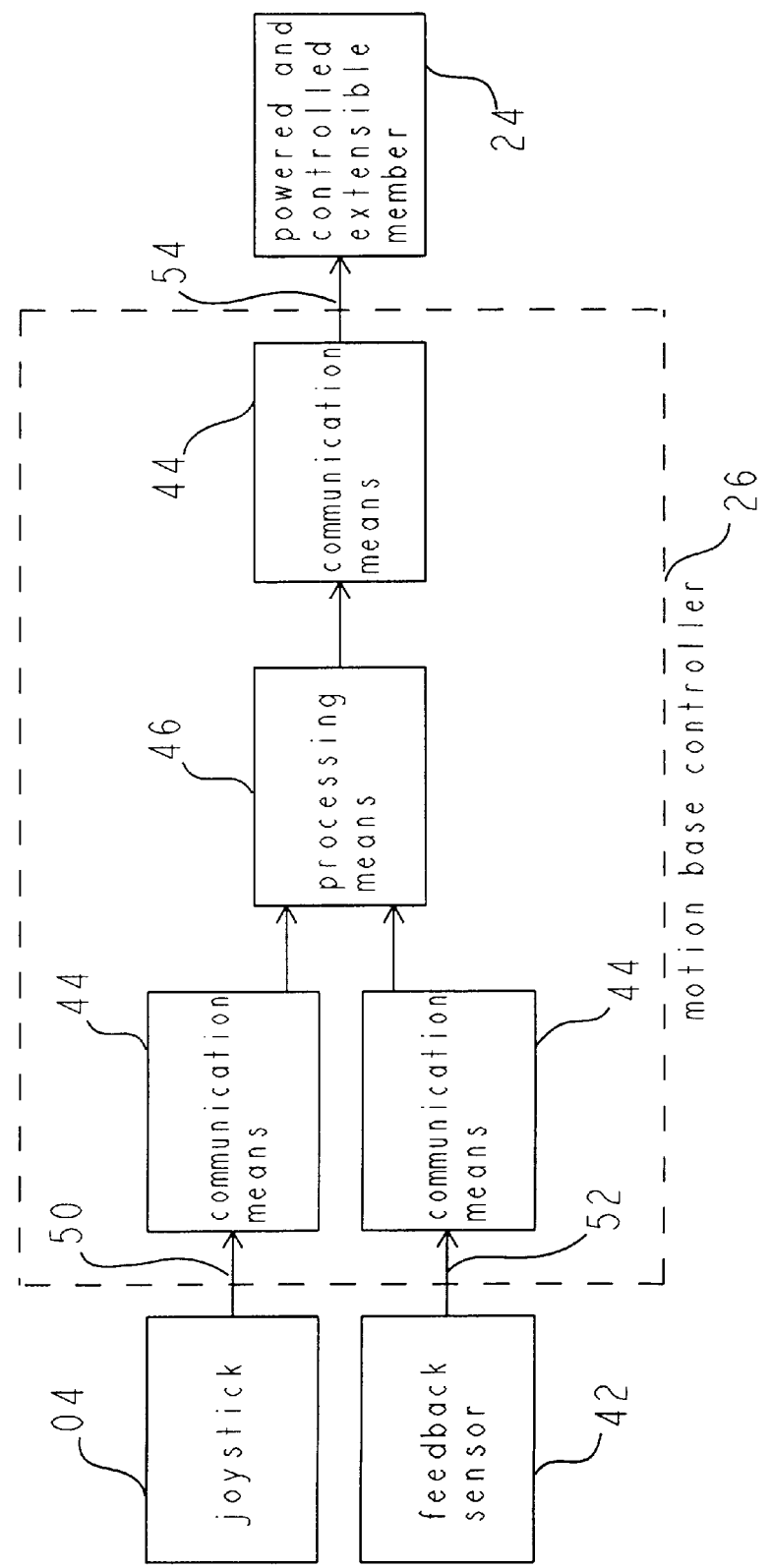
FIG. 4 shows a block diagram of the motion base controller in accordance with the present invention for providing computing resources to operate and control a motion base.

Referring now to FIG. 4 where a block diagram of the motion base controller (26) is shown. The motion base controller (26) is comprised of a communication means (44) to receive control signals (50) from the joystick (04) or the computer game via the home computer (08); a processing means (46) to manipulate the control signals (50) to generate the appropriate command signals (54); another communication means (44) to send the command signals (54) to the controlled and extensible member (24). As a result, the controlled and extensible member (24) changes length thereby imparts motion.

When closed loop control is employed, a feedback sensor (42) tracks the motion of the platform (22) and sends feedback signals (52) to the motion base controller (26). These signals are compared to the control signals (50) from the motion control device (04) (or the computer game via the home computer (08)) to generate command signals (54).

Figure 5:
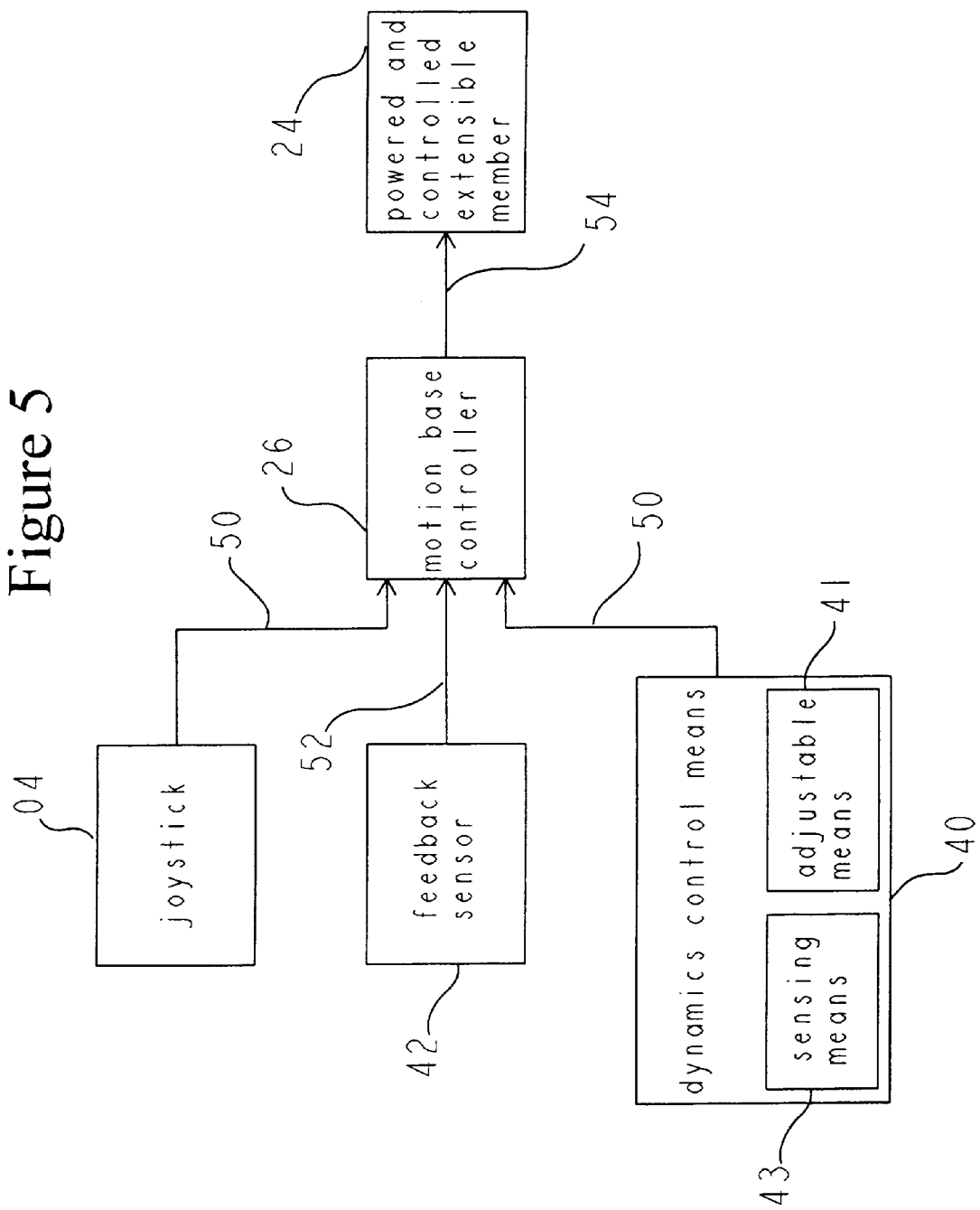
FIG. 5 shows a block diagram of a dynamics control means of the present invention for adjusting the dynamic characteristics of the motion base.

Referring now to FIG. 5, the block diagram of a dynamics control means (40) of the present invention is shown. The dynamics control means (40) provides a means to adjust the dynamic performance of the motion base (10). It provides an additional control signal (50) to the motion base controller (26) apart from the control signals (50) from the joystick (04) or the computer game via the home computer (08) and control signals (50) from feedback sensor (42). The motion base controller (26) is engineered to adjust the command signals (54) to the motion base (10) according to the control signals (50) from the dynamics control means (40). As a result, both the velocity and acceleration profiles of the motion base are adjusted.

Operation

When the motion simulator (10) is used in an interactive computer/video game, it is connected to the electrical outlet for power. For the control signals (50), it is connected to the home computer (08) or a video console, and a motion control device like a joystick (04) or any other control devices. The home computer (08) has computer program game software installed within to generate visual imagery on the video monitor. In one set-up, the motion base controller (26) is connected to the home computer (08). As the computer receives control signals (50) from the motion control device (04), the same signals are simultaneously sent to the motion base controller (26). It is also possible to have the control signals (50) sent directly from the computer program to the motion base controller (26) via the computer (08). In another set-up, the motion base controller (26) is connected to the motion control device (04) to receive control signals (50). In this mode, both the computer program and the motion base controller (26) receive identical signals from the motion control device (04). Synchronization between the visual imagery on the video monitor and the motion generated by the motion simulator (10) is therefore achieved.

Referring now to FIG. 3A which depicts a motion simulator (10) that allows pitch (12) motion. The extensible member (24), when actuated, causes the platform (22) to pitch (12) with respect to the support base (20). As the platform (22) moves from the parallel position from the support base (20), relative movements between the top of the extensible member (24) and the platform (22) are produced. They are accommodated by the connection or joint (30) permitting relative movement about the point between the top of the extensible member (24) and the platform (22). Atop the support column (28) is another type of pivot joint (32). In the simplest form, this pivot joint (32) is a hinge that allows rotation about one axis and transfers forces and moments in all other axes.

The motion base controller (26) is shown to be mounted on the support base (20) internal to the motion base in the preferred embodiment. But it can be placed at any appropriate location. And, it can be configured in a standalone module external to the motion base. Likewise, the dynamics control means (40) can be configured either internal or external to the space between the movable platform (22) and the support base (20).

Although the support column (28) is shown to be at the center of the support base (20) and the extensible member (24) directly behind, the actual placement of these components can be configured in many different fashions. Similarly, the placement of the motion base controller (26) can be at locations different from what is depicted in FIG. 3A. The actual shape of the top side of the platform (22) allows a shorter overall vertical height but it is not essential to our motion simulator.

Referring now to FIG. 3B where the portable and compact motion simulator (10) allows roll (14) movement. The construction is very similar to the design shown in FIG. 3A with the exception of the pivot joint (32) atop the support column (28) and the placement of the powered and controlled extensible member (24). The support column (28) is located at approximately the center of the support base (20). The pivot joint (32) atop the support column (28) allows the platform (22) to roll (14) with respect to the support base (20). The extensible member (24) is located next to the support column (28). In the simplest form, the pivot joint (32) atop the support column (28) can be a simple hinge.

Referring now to FIG. 3C where the portable and compact motion simulator (10) allows yaw (16) movement. The construction is very similar to the design shown in FIG. 3A with the exception of the pivot joint (32) atop the support column (28) and the placement of the powered and controlled extensible member (24). The support column (28) is located at approximately the center of the support base (20) and the extensible member (24) is located in a near horizontal plane. In the simplest form, the pivot joint (32) that allows the platform (22) to yaw (16) is a turntable bearing or "lazy susan".

Referring now to FIG. 4 where a block diagram of the motion base controller (26) is shown. The motion base controller (26) provides computing resources to operate and control the motion base, thereby eliminating the need for computing resources external to the motion base. The motion base controller (26) is comprised of at least two communication means (44) and a processing means (46). Control signals (50) from the joystick (04) of the computer game via the home computer (08) are received at the motion base controller (26) through a communication means (44). The processing means (46), which is comprised of a microcontroller or a micro-processor, manipulates the control signals (50) to generate appropriate command signals (54). The command signals (54) are then sent to the controlled and extensible member (24) via a second communication means (44). The command signals (54) cause change in the extensible member's length thereby imparting motion.

With closed loop feedback control, the motion base controller (26) further comprises a third communication means (44). In the preferred embodiment, the feedback sensor (42) tracks the position of the movable platform (22). It sends feedback signals (52), which indicate the position of the movable platform (22), to the motion base controller (26). The feedback signals (52) are then compared to the control signals (50). The differences, commonly referred to as the error signals, are translated into command signals (54) for the extensible member (24). In another embodiment, the feedback sensor (42) may track the acceleration, velocity, or any other appropriate motion parameter.

The processing means (46) is applicable to various different design applications of the portable and compact motion simulator (10). It is not limited to any number of degrees-of-freedom afforded by the motion base. With this built-in computing resources, the portable and compact motion simulator (10) can be operated and controlled in a standalone mode. And, it allows the motion simulator (20) to be adapted to any home computer (08).

Referring now to FIG. 5 where a block diagram of the dynamics control means (40) is shown. The adjustable means (41) provides an additional control signal (50) to the motion base controller (26) to adjust the overall velocity and acceleration of the motion base (10). In a simple application, the acceleration level is increased or decreased according to the additional control signal (50). In a more complex application, both the acceleration profile (against time) and the velocity profile can be changed in a predetermined fashion according to the additional control signal (50).

In the simplest form, the adjustable means (41) can be a variable resistor mounted on the side of the movable platform (22) for easy access. The patron (02) will set the variable resistor to a graduated scale. The variable resistor triggers a reference voltage to the motion base controller (26) to adjust its velocity and acceleration profile.

In a more advanced application of the dynamics control means (40), a sensing means (43) is incorporated into the motion base (10) to detect the weight of the patron (02). An additional control signal (50) will be sent to the motion base controller (26) by the adjustable means (41) to adjust the dynamic performance of the motion base (10). In this arrangement, the patron (02) may not be aware that the dynamic performance of the motion base (10) are being automatically adjusted.

Conclusions, Ramifications, and Scope

This invention relates to a portable and compact motion simulator that is small in size, light-weight, portable, and easy to install. The portable and compact motion simulator with a single degree-of-freedom offers a unique compromise between performance and cost.

The portable and compact motion simulator can be in different physical forms other than a seat or part of a chair. It can be installed on the floor with the platform in the form of a simple flat plate. The patron can stand on the platform to engage in a virtual reality type of game play. The motion simulator system will be able to generate motion to the patron in this format. Alternatively, the compact motion simulator can be installed in the inverted position. The support base can be bolted to a ceiling structure with the platform hanging off the base. Some harness or suspension system can be installed to the platform to support the weight of the patron. Through the action of the compact motion simulator, the patron will be moved through the simulation.

Placement of the actuator in the portable and compact motion simulator, which determines the packaging envelope, is not as critical if more room is allowed for the installation.

The portable and compact motion simulator is used in conjunction with a home computer for interactive computer game play. The home computer can be selected from the group of Intel-based personal computers, other types of personal computers, work stations, or video consoles which are specific purpose computers built for video game play.

The motion base controller has a built-in processing means to provide computing resources to operate and control the motion base, thereby eliminating the need for computing resources external to the motion base. This processing means can be provided for using one of the many commercially available micro-controllers or logic circuitry.

The motion base controller with a built-in processing means allows the motion simulator to run without any external computing resources thereby making the motion simulator a standalone design. This resident processing means can be applied to any portable and compact motion simulator regardless of their range of motion and number of degrees-of-freedom.

In the preferred embodiment, the motion base controller providing dedicated computing resources to the motion base is mounted internal to the motion base envelope. But it is also possible to have the motion base controller in a standalone module with its own enclosure. In such case, the motion base controller is mounted in-line between the power source and the motion base.

The pending parent patent application, Ser. No. 08/915,259, covers applications of the compact motion simulators in the theater environment. In such an application, a plurality of motion simulators are connected to a common system controller to provide synchronized motion to pre-recorded visual images and audio effects. The system controller provides prerecorded control signals to the individual motion base controllers and serves the same function as the motion control device in the home computer game application. The system controller also has storage means for pre-recorded visual images and audio effects. A conventional system would require a dedicated simulation computer to operate and control the individual motion bases. With the present invention, each motion simulator is operated and controlled by its own motion base controller. Thus, a dedicated simulation computer is eliminated leaving the system controller to manage control signals and stored data only.

The support column and the base support have been depicted as two separate parts according to their functionality. In reality, the support column can be made an integral part of the base support. Therefore, both part count and production cost are reduced.

The motion simulator with a single degree-of-freedom can be configured to enable motion in a translational degree-of-freedom. It is conceivable that the portable and compact motion simulator can provide motion in the heave, fore-aft, or lateral direction.

The motion simulator can be configured to provide rocking motion to its patron. The actuation element can be replaced with a reciprocating motor drive. In practice, the present motion simulator design can be modified to function as a compact rocking cradle for infants.

Although the description above contains many specificities, these should not be construed as limiting the scope of the invention but as merely providing illustrations of some of the presently preferred embodiments of this invention. It will be apparent to those skilled in the art that various modifications and improvements may be made without departing from the scope and spirit of the invention. Thus the scope of the invention should be determined by the appended claims and their legal equivalents, rather than by the examples given.

We claim:

1. A portable motion base for providing motion in one degree-of-freedom to its patron comprising:

platform means having two points of connection;

support base means having a single point of connection;

support column extending from said support base means to a connection point in said platform means, wherein said support column having coupling means for permitting rotational movement about said connection point and providing a pivot at said connection point;

actuator means having only one powered and controlled extensible member, wherein said powered and controlled extensible member including a movable member being connected between the second connection point of said platform means and said connection point of said support base means by a joint means for permitting any relative movement; and motion base controller means for actuating said moveable member of said powered and controlled extensible member in the selective changes in length, thereby providing motion in said degree-of-freedom;

wherein said portable motion base is in the form of a part of a chair having accommodation means for said patron, and wherein said motion base controller means including communication means for receiving external control signals from a dynamics control means which is controlled by said patron, thereby providing an interactive motion simulation.

2. The portable motion base of claim 1, wherein said degree-of-freedom is rotation about the pitch axis.

3. The portable motion base of claim 1, wherein said degree-of-freedom is rotation about the roll axis.

4. The portable motion base of claim 1, wherein said degree-of-freedom is rotation about the yaw axis.

5. The portable motion base of claim 1, wherein said movable member of said powered and controlled extensible member is a screw, and wherein said powered and controlled extensible member further comprises an electric motor and a floating nut threadably received on said screw.

6. A portable motion base for providing interactive motion simulation to its patron comprising:

a portable motion base in the form of a part of a chair having accommodation means for a patron, said portable motion base including platform means having two points of connection;

support base means having a single point of connection;

support column extending from said support base means to a connection point in said platform means, wherein said support column having coupling means for permitting rotational movement about said connection point and providing a pivot at said connection point;

actuator means having only one powered and controlled extensible member, wherein said powered and controlled extensible member including a movable member being connected between the second connection point of said platform means and said connection point of said support base means by a joint means for permitting any relative movement;

dynamics control means which is controlled by said patron for generating signal to adjust the velocity and acceleration of said portable motion base; and motion base controller means for actuating said moveable member of said powered and controlled extensible member in the selective changes in length, thereby providing motion in said degree-of-freedom; and computer means having memory means for storing program means, control means for generating control signals, and a video monitor for displaying a changing video image on said monitor in response to said signal from said dynamics control means controlled by said patron, said control signals from said control means and said program means;

wherein said portable motion base is adapted to said computer means, and wherein said motion base controller means including communication means for receiving said signal from said dynamics control means, said control signals from said control means and said program means, thereby providing motion in synchronization with the changing video image on said monitor.

7. The portable motion base of claim 6, wherein said degree-of-freedom is rotation about the pitch axis.

8. The portable motion base of claim 6, wherein said degree-of-freedom is rotation about the roll axis.

9. The portable motion base of claim 6, wherein said degree-of-freedom is rotation about the yaw axis.

10. The portable motion base of claim 6, wherein said movable member of said powered and controlled extensible member is a screw, and wherein said powered and controlled extensible member further comprises an electric motor and a floating nut threadably received on said screw.

11. A method of simulating interactive motion with a portable motion base, comprising the steps of:

providing a portable and compact motion base in the form of a part of a chair having accommodation means for a patron, said portable motion base including platform means having three points of connection which lie generally in a plane;

support base means having three points of connection in another plane;

actuator means having only three powered and controlled extensible members, wherein each one of said powered and controlled extensible members including movable member and joint means, and each of said powered and controlled extensible members being connected between a different one of said three connection points of said platform means and a different one of said three connection points of said support base means by said joint means for permitting any relative movement between each one of said powered and controlled extensible members;

dynamics control means which is controlled by said patron for generating signal to adjust the velocity and acceleration of said portable motion base; and motion base controller means for actuating said moveable member of each one of said powered and controlled extensible member in the selective changes in length, thereby providing motion in three degree-of-freedom, which including pitch, roll and heave, or any combination thereof;

providing computer means having memory means for storing program means, control means for generating control signals, and a video monitor for displaying a changing video image on said monitor in response to said signals from said dynamics control means controlled by said patron, said control signals from said control means and said program means;

wherein said portable motion base is adapted to said computer means, and wherein said motion base controller means including communication means to receive said signal from said dynamics control means, said control signals from said control means and said program means;

processing said signal from said dynamics control means and said control signals to generate command signals by said computer means; and transmitting said command signals to said powered and controlled extensible member means in said portable motion base by said communication means, thereby providing motion in synchronization with the changing video image on said monitor, and eliminating the need of an external source of computing means to run said portable motion base.

12. The method of claim 11, further comprises the steps of receiving feedback signals from a sensing means in said portable motion base; and comparing said signal from said dynamics control means, and said control signals to said feedback signals from said sensing means to generate a closed loop feedback control for modifying the command signals.

13. A method of simulating interactive motion by providing a motion base controller with computing resource to operate and control a portable and compact motion base in response to control signal from a motion control device or a program means that changes video images on a display monitor comprising the steps of:

providing a portable motion base in the form of a part of a chair having accommodation means for a patron, said portable motion base including platform means having three points of connection which lie generally in a plane;

support base means having two points of connection in another plane;

support column extending from said support base means to a connection point in said platform means, wherein said support column having coupling means for permitting rotational movement about said connection point and providing a pivot at said connection point;

actuator means having only two powered and controlled extensible members, wherein each one of said powered and controlled extensible members including movable member and joint means, and each of said powered and controlled extensible members being connected between a different one of said three connection points of said platform means and a different one of said two connection points of said support base means by said joint means for permitting any relative movement between each one of said powered and controlled extensible members;

dynamics control means which is controlled by said patron for generating signal to adjust the velocity and acceleration of said portable motion base; and motion base controller means for actuating said moveable member of each one of said powered and controlled extensible member in the selective changes in length, thereby providing motion in two degree-of-freedom, which including pitch and roll, or any combination thereof;

providing computer means having memory means for storing program means, control means for generating control signals, and a video monitor for displaying a changing video image on said monitor in response to signal from said dynamics control means controlled by said patron, said control signals from said control means and said program means;

wherein said portable motion base is adapted to said computer means, and wherein said motion base controller means including communication means to receive said control signal from said dynamics control means, said control signals from said control means and said program means;

processing said signal from said dynamics control means and said control signals to generate command signals by said computer means; and transmitting said command signals to said powered and controlled extensible member means in said portable motion base by said communication means, thereby providing motion in synchronization with the changing video image on said monitor, and eliminating the need of an external source of computing means to run said motion base.

14. The method of providing a motion base controller with computing resources of claim 13, further comprises the step of receiving feedback signals from a sensing means in said portable motion base; and comparing said signal from said dynamics control means and said control signals to said feedback signals from said sensing means to generate a closed loop feedback control for modifying the command signals.

15. A dynamics control means for use to adjust the velocity and acceleration of a portable and compact motion base in accordance with the weight of its patron, comprising:

a portable motion base in the form of a part of a chair having accommodation means for a patron, said portable motion base including platform means having three points of connection which lie generally in a plane;

support base means having two points of connection in another plane;

support column extending from said support base means to a connection point in said platform means, wherein said support column having coupling means for permitting rotational movement about said connection point and providing a pivot at said connection point;

actuator means having only two powered and controlled extensible members, wherein each one of said powered and controlled extensible members including movable member and joint means, and each of said powered and controlled extensible members being connected between a different one of said three connection points of said platform means and a different one of said two connection points of said support base means by said joint means for permitting any relative movement between each one of said powered and controlled extensible members;

dynamics control means having a sensing means for detecting the weight of said patron; and an adjustable means that sends a signal to said motion base controller means of said portable motion base, whereby the output of said motion base controller means is automatically adjusted according to said signal; and motion base controller means for actuating said movable member of each one of said powered and controlled extensible member in selective changes in length, thereby providing motion in two degree-of-freedom, which including pitch and roll, or any combination thereof; and computer means having memory means for storing program means, control means for generating control signals, and a video monitor for displaying a changing video image on said monitor in response to said signal from said dynamics control means controlled by said patron, said control signals from said control means and said program means;

wherein said portable motion base is adapted to said computer means, and wherein said motion base controller means including communication means for receiving said signal from said dynamics control means, said control signals from said control means and said program means, thereby providing motion in synchronization with the changing video image on said monitor.

16. A method of providing a dynamics control means for use to adjust the velocity and acceleration of a portable and compact motion base in accordance with the weight of its patron, comprising the steps of:

providing a portable motion base in the form of a part of a chair having accommodation means for a patron, said portable motion base including platform means having three points of connection which lie generally in a plane;

support base means having two points of connection in another plane;

support column extending from said support base means to a connection point in said platform means, wherein said support column having coupling means for permitting rotational movement about said connection point and providing a pivot at said connection point;

actuator means having only two powered and controlled extensible members, wherein each one of said powered and controlled extensible members including movable member and joint means, and each of said powered and controlled extensible members being connected between a different one of said three connection points of said platform means and a different one of said two connection points of said support base means by said joint means for permitting any relative movement between each one of said powered and controlled extensible members;

dynamics control means having a sensing means for detecting the weight of said patron; and an adjustable means that sends a signal to said motion base controller means of said portable motion base; and motion base controller means for actuating said moveable member of each one of said powered and controlled extensible member in the selective changes in length, thereby providing motion in two degree-of-freedom, which including pitch and roll, or any combination thereof; and providing computer means having memory means for storing program means, control means for generating control signals, and a video monitor for displaying a changing video image on said monitor in response to said signal from said dynamics control means controlled by said patron, and control signals from said control means and said program means;

wherein said portable motion base is adapted to said computer means, and wherein said motion base controller means including communication means to receive said signal from said dynamics control means, and control signals from said control means and said program means;

automatically adjusting the velocity and acceleration of said motion base in response to said signal of the detected weight of said patron;

processing said signal from said dynamic control means and said control signals to generate command signals by said computer means; and transmitting said command signals to said powered and controlled extensible member means in said portable motion base by said communication means, thereby providing motion in synchronization with the changing video image on said monitor.

17. A method of simulating interactive motion with a portable motion base, comprising the steps of:

providing a portable and compact motion base in the form of a part of a chair having accommodation means for a patron, said portable motion base including platform means having two points of connection which lie generally in a plane;

support base means having a single point of connection in another plane;

support column extending from said support base means to a connection point in said platform means, wherein said support column having coupling means for permitting rotational movement about said connection point and providing a pivot at said connection point;

actuator means having only one powered and controlled extensible member, wherein said powered and controlled extensible member including a movable member being connected between the second connection point of said platform means and said connection point of said support base means by a joint means for permitting any relative movement;

dynamics control means which is controlled by said patron for generating signal to adjust the velocity and acceleration of said portable motion base; and motion base controller means for actuating said moveable member of said powered and controlled extensible member in the selective changes in length, thereby providing motion in said degree-of-freedom;

providing computer means having memory means for storing program means, control means for generating control signals, and a video monitor for displaying a changing video image on said monitor in response to said signal from said dynamics control means controlled by said patron, said control signals from said control means and said program means;

wherein said portable motion base is adapted to said computer means, and wherein said motion base controller means including communication means to receive said signal from said dynamics control means, said control signals from said control means and said program means;

processing said signal from said dynamics control means and said control signals to generate command signals by said computer means; and transmitting said command signals to said powered and controlled extensible member means in said portable motion base by said communication means, thereby providing motion in synchronization with the changing video image on said monitor, and eliminating the need of an external source of computing means to run said motion base.

18. The method of claim 17, further comprises the steps of receiving feedback signals from a sensing means in said portable motion base; and comparing said signal from said dynamics control means and said control signals to said feedback signals from said sensing means to generate a closed loop feedback control for modifying the command signals.

19. A method of providing a dynamics control means for use to adjust the velocity and acceleration of a portable and compact motion base in accordance with the weight of its patron, comprising the steps of:

providing a portable motion base in the form of a part of a chair having accommodation means for a patron, said portable motion base including platform means having three points of connection which lie generally in a plane;

support base means having three points of connection in another plane;

actuator means hav ing only three powered and con trolled extensible members, wherein each one of said powered and controlled extensible members includ- ing movable member and joint means, and each of said powered and controlled extensible members being connected between a different one of said three connection points of said platform means and a different one of said three connection points of said support base means by said joint means for permit- ting any relative movement between each one of said powered and controlled extensible members;

dynamics control means having a sensing means for detecting the weight of said patron; and an adjustable means that sends a signal to said motion base con- troller means of said portable motion base; and motion base controller means for actuating said move- able member of each one of said powered and controlled extensible member in the selective changes in length, thereby providing motion in three degree-of-freedom, which including pitch, roll and heave, or any combination thereof; and providing computer means having memory means for storing program means, control means for generating control signals, and a video monitor for displaying a changing video image on said monitor in response to said signal from said dynamics control means con- trolled by said patron, and control signals from said control means and said program means;

wherein said portable motion base is adapted to said computer means, and wherein said motion base controller means including communication means to receive said signal from said dynamics control means, and control signals from said control means and said program means;

automatically adjusting the velocity and acceleration of said motion base in response to said signal of the detected weight of said patron;

processing said signal from said dynamic control means and said control signals to generate command signals by said computer means; and transmitting said command signals to said powered and controlled extensible member means in said portable motion base by said communication means, thereby providing motion in synchronization with the changing video image on said monitor.

20. A method of providing a dynamics control means for use to adjust the velocity and acceleration of a portable and compact motion base in accordance with the weight of its patron, comprising the steps of:

providing a portable motion base in the form of a part of a chair having accommodation means for a patron, said portable motion base including platform means having two points of connection which lie generally in a plane;

support base means having a single point of connection in another plane;

support column extending from said support base means to a connection point in said platform means, wherein said support column having coupling means for permitting rotational movement about said con- nection point and providing a pivot at said connec- tion point;

actuator means hav ing only one powered and con- trolled extensible member, wherein said powered and controlled extensible member including a mov- able member and joint means, and said powered and controlled extensible member being connected between the second connection point of said plat- form means and said connection point of said sup- port base means by said joint means for permitting any relative movement;

dynamics control means having a sensing means for detecting the weight of said patron; and an adjustable means that sends a signal to said motion base con- troller means of said portable motion base; and motion base controller means for actuating said move- able member of said powered and controlled exten- sible member in the selective changes in length, thereby providing motion in said degree-of-freedom; and providing computer means having memory means for storing program means, control means for generating control signals, and a video monitor for displaying a changing video image on said monitor in response to said signal from said dynamics control means con- trolled by said patron, and control signals from said control means and said program means;

wherein said portable motion base is adapted to said computer means, and wherein said motion base controller means including communication means to receive said signal from said dynamics control means, and control signals from said control means and said program means;

automatically adjusting the velocity and acceleration of said motion base in response to said signal of the detected weight of said patron;

processing said signal from said dynamic control means and said control signals to generate command signals by said computer means; and transmitting said command signals to said powered and controlled extensible member means in said portable motion base by said communication means, thereby providing motion in synchronization with the changing video image on said monitor.

* * * * *